United States Patent [19]

Schlachter

[11] Patent Number: 5,324,089

[45] Date of Patent: Jun. 28, 1994

[54] CONVERTIBLE SECURITY ENCLOSURE FOR OPEN DECK VEHICLE

[76] Inventor: Bradley S. Schlachter, P.O. Box 12168, Dallas, Tex. 75225

[21] Appl. No.: 937,159

[22] Filed: Aug. 31, 1992

[51] Int. Cl.[5] .............................................. B60R 5/04
[52] U.S. Cl. ................................. 296/37.5; 296/37.6; 292/DIG. 43
[58] Field of Search ................... 296/24.1, 37.5, 37.6, 296/37.16, 76; 224/42.01, 42.42; 292/175, DIG. 29, DIG. 43; 180/69.24

[56] References Cited

U.S. PATENT DOCUMENTS

| | | | |
|---|---|---|---|
| 3,640,423 | 2/1972 | Parker et al. | 296/37.6 X |
| 4,828,312 | 5/1989 | Kinkel et al. | 296/37.6 |
| 4,938,519 | 7/1990 | Schlachter | 296/37.6 |

Primary Examiner—David M. Mitchell
Assistant Examiner—Andrew C. Pike

Attorney, Agent, or Firm—Dennis T. Griggs

[57] ABSTRACT

A security enclosure is mounted on the open load deck of a jeep between the rear seat and the tailgate. The load deck, deck sidewalls, and tailgate provide four sidewalls of the security compartment. Top and forward enclosure panels of the security enclosure are movably coupled together for pivotal movement by a hinge. The forward enclosure panel is stabilized by side flanges which are rigidly attached in flush engagement to the load deck side panels. The top enclosure panel is releasably locked to the load deck side panels by spring loaded lock pins which are concealed within the security compartment. According to this arrangement, access to the security compartment and to the lock assembly is controlled by normal operation of the tailgate and its lock. Upon release of the lock pins, the top enclosure panel may be rotated out of the way to provide a top opening access to the load deck for accommodating oversized articles.

1 Claim, 4 Drawing Sheets

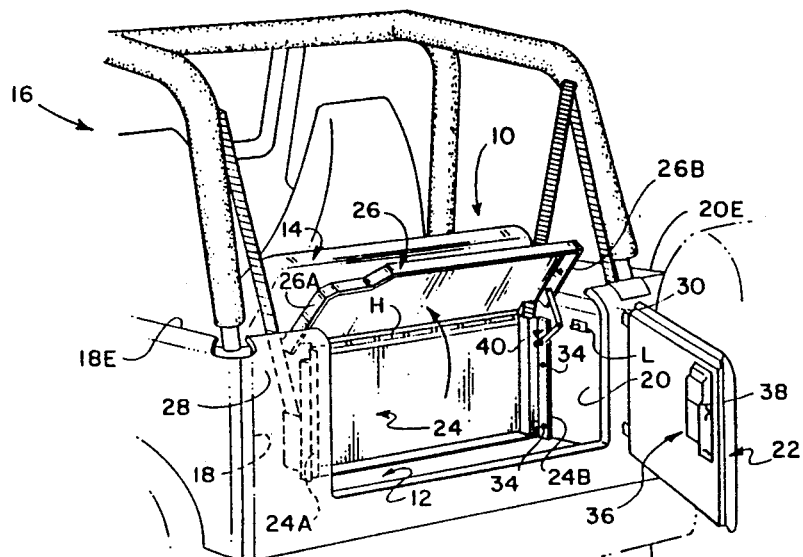
FIG. 3
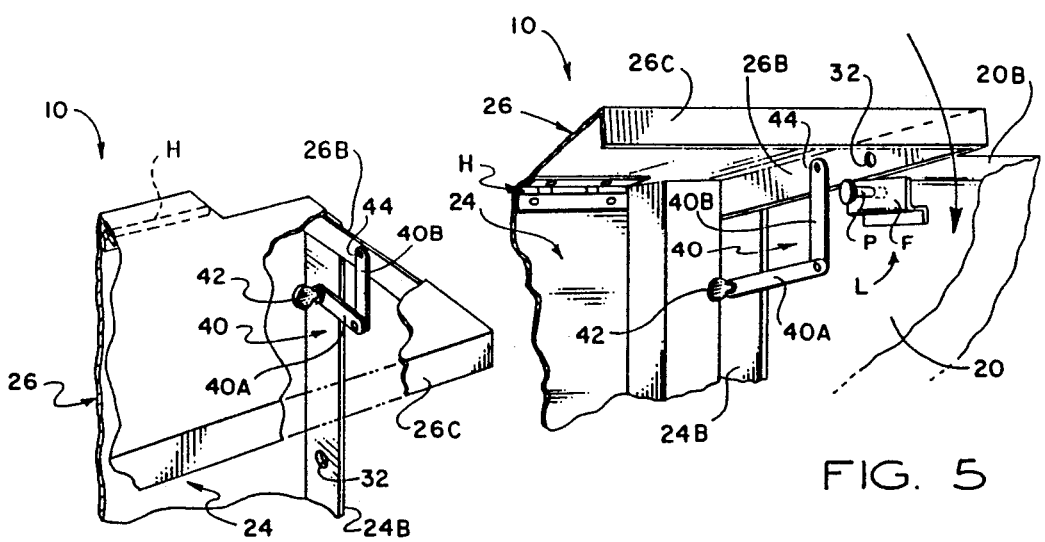
FIG. 4
FIG. 5

CONVERTIBLE SECURITY ENCLOSURE FOR OPEN DECK VEHICLE

FIELD OF THE INVENTION

This invention relates generally to security enclosures which are adapted for use in combination with the load deck of an open deck vehicle such as a jeep or pickup truck.

BACKGROUND OF THE INVENTION

The cargo-carrying area of an open deck vehicle such as a jeep or pickup truck is commonly referred to as the load deck. Cargo space for tools, luggage, portable radios, portable telephones, cassette tapes, tape decks, jewelry, and other valuables may not be fully utilized because of the risk of unauthorized use or theft of such portable property when it is left unsecured and unattended on the load deck.

Engineers, contractors, technicians and skilled tradesmen use pickup trucks and jeeps to transport documents, tools, and other portable items to construction sites. Such personal property must be off-loaded and secured, or alternatively, left unguarded on the open deck of the vehicle.

DESCRIPTION OF THE PRIOR ART

It is known to provide storage enclosures for securing portable property such as tools and equipment on the load deck of an open deck vehicle. Such storage units are mounted onto or along the sidewalls of the open deck. Presently, conventional storage enclosures are approximately the size and shape of a steamer trunk and are installed at a forward location on the load deck just behind the cab.

Many contractors and craftsmen, finding such security enclosures to be inadequate, have adapted camper shells and canopies for attachment to the load deck sidewalls for securing portable equipment and tools. Others have attempted to secure their valuables by a slidable tonneau cover which attaches onto the sidewalls of the load deck. Some limitations of the commercially available security enclosures are as follows:

Conventional tool boxes when mounted onto the load deck of a pickup or jeep are conspicuous and accessible to unauthorized persons; the locking system for such security enclosures is easily snapped open with a pry bar; such security enclosures may be easily removed if not bolted to the body of the pickup truck; the presence of a security enclosure such as a tool box which extends across the load deck interferes with the placement and mounting of portable covering enclosures such as a canopy, camper shell, and the like; such secure storage units usually have a lock which requires a separate key for opening, and cannot be opened by the vehicle ignition key or door key; and such add-on security enclosures cannot be easily integrated into an on-board vehicle security system which provides an alarm in response to tampering and/or forcible entry.

A secure storage unit for mounting on the open deck of a pickup truck or jeep which overcomes the foregoing limitations is disclosed in U.S. Pat. No. 4,938,519 entitled "Security Enclosure for Open Deck Vehicle", by Bradley S. Schlachter The security enclosure is mounted on the open load deck of a jeep or other vehicle between the rear seat and the tailgate. The load deck, deck sidewalls, and tailgate provide four sidewalls of the security compartment. The top and forward walls of the security enclosure are provided by top and forward panels which are secured together along a common edge in an L-shaped configuration. The top and forward panels are stabilized by side flanges which are adapted for flush engagement against the load deck side panels.

Because the security enclosure lies below the deck sidewalls, it does not interfere with the attachment of a camper shell, canopy, or other covering. When the tailgate is closed, the security enclosure is concealed and the top panel appears to be part of the rear wheel well structure. Because the side flanges are securely fastened to the deck side panels, access to the security compartment can be gained only by first opening the tailgate. Accordingly, the security compartment is secured and locked when the tailgate is closed and locked. Personal property can be safely stored within the security compartment when it is necessary to leave the vehicle unattended. Additionally, if the vehicle is equipped with an electronic security alarm which monitors the tailgate lock, the security compartment will be further protected by the on-board vehicle security system since the security enclosure does not interfere with operation of the tailgate door or the lock assembly.

Because the security compartment paneling is fastened internally by threaded fasteners, or in some installations by welding, the security enclosure becomes a permanent fixture upon installation. Consequently, the security enclosure imposes a limitation on the use of the load deck of the vehicle for cargo handling. That is, the load deck volume enclosed within the compartment can only be used for securing items which are small enough to fit within the enclosed space.

Occasionally, a need arises for transporting large items which cannot fit within the security enclosure space. Some examples of such items include hunting rifles, fishing rods, oversized packages, rolled construction blueprints, beverage coolers, camping tents, and the like. In most instances, such oversized items could be transported on the rear deck of the vehicle, by standing such items on end, lashing them to the deck sidewall or roll bars, or laying such items transversely across the rear deck, with one end portion resting on a sidewall. It will be appreciated that such large articles cannot be accommodated when a permanent security enclosure of the type having a tailgate access is installed. In such arrangements, the ability to accommodate large, oversized articles is given up for secure, unattended storage of smaller items.

OBJECTS OF THE INVENTION

It is, therefore, the principal object of the present invention to provide an improved secure storage unit for mounting on the open deck of a pickup truck or jeep, for use by engineers, contractors, carpenters, cabinetmakers, electricians, plumbers, and other persons who must leave the open deck vehicle unattended, wherein the secure storage unit is usable in a secure storage configuration in which access to the security compartment is provided by the tailgate of the vehicle, for providing secure storage of personal property while the vehicle is unattended, and is manually convertible from the secure storage configuration to an open deck configuration for accommodating large, oversized articles.

Another object of the invention is to provide a security enclosure for mounting on the load deck of an open deck vehicle, wherein the top enclosure panel of the security unit is releasably attached to the load deck side panels of the vehicle when it is in the secure storage, tailgate access configuration, and which can be released from the load deck sidewalls and moved to a retracted position in which the security compartment is exposed and the load deck is open for receiving oversized articles.

A related object of this invention is to provide a security enclosure of the character described wherein the top enclosure panel is secured to the load deck panels by a manually releasable lock, where acess to the security compartment and to the manual lock is provided only through the tailgate of the vehicle.

Yet another object of the present invention is to provide a security enclosure for use on the load deck of an open deck vehicle such as a jeep or pickup truck, with the top of the security compartment appearing to form an integral part of the load deck when it is in the secure compartment configuration, and providing a stable auxiliary load deck in the open compartment configuration.

Another object of the present invention is to provide a security enclosure of the character described wherein the top enclosure panel is secured by a manually releasable lock which is concealed within the security compartment when the top enclosure panel is in the secure compartment configuration.

Still another object of the present invention is to provide a manually convertible security enclosure for use on the load deck of an open deck vehicle of the type having a rear seat and a tailgate spaced apart across an open deck, wherein the rear seat has a back support portion which is foldable forward away from the tailgate, and wherein the top enclosure panel of the convertible security compartment is rotatable from a retracted, closed compartment position in which it is lockable onto the load deck side panels, and is rotatable to an open position in which it overlies the seat back portion in its folded, collapsed position.

SUMMARY OF THE INVENTION

The foregoing objects are accomplished by a preferred embodiment of the present invention in which the load deck, deck sidewalls, and tailgate provide four sides of a security enclosure. The top and forward sides of the security enclosure are provided by top and forward panels which are movably coupled together by a hinge. The side panels are stabilized by side flanges which are adapted for flush engagement and rigid attachment to the load deck side panels. The top enclosure panel is recessed below the top edge of the load deck side panels, and has a rear flange adapted for flush engagement against the tailgate. The top panel has a notch formed along the rear edge thereof for receiving the latch housing of the tailgate door when it is closed.

The top enclosure panel is pivotally coupled by the hinge to the forward panel, and is movable from a retracted, closed compartment configuration in which it is adapted for flush engagement against the tailgate, in which it has the appearance of an elevated portion of the load deck. The top enclosure panel is releasably secured to the load deck side panels by a manual lock which is concealed within the security compartment when the tailgate is closed. Access to the manual lock is provided only through the tailgate of the vehicle, so that the top enclosure panel can be opened only by first unlocking the tailgate. When the manual lock is released, the top enclosure panel may be manually opened and rotated to an upright, stable position to provide top opening access to the security compartment so that oversized and large articles can be carried in the security compartment. The top enclosure panel may also be further extended in pivotal movement to a position overlying the folded rear seat of the vehicle. In the fully extended position, the top enclosure panel provides a stable, auxiliary load support surface. The security unit is quickly convertible from the closed security compartment configuration to the open compartment configuration without requiring special tools.

Operational features and advantages of the present invention will be understood by those skilled in the art upon reading the detailed description which follows with reference to the attached drawings, wherein:

BRIEF DESCRIPTION OF THE DRAWINGS

FIG. 3 is a view similar to FIG. 1 showing the top enclosure panel being extended toward the open compartment configuration;

FIG. 4 is a perspective view, partially broken away and partially in section, showing the attachment of a stabilizer;

FIG. 5 is a view similar to FIG. 4 showing coupling engagement of the top enclosure panel with a manually releasable lock;

DETAILED DESCRIPTION OF THE PREFERRED EMBODIMENT

Figure 1:
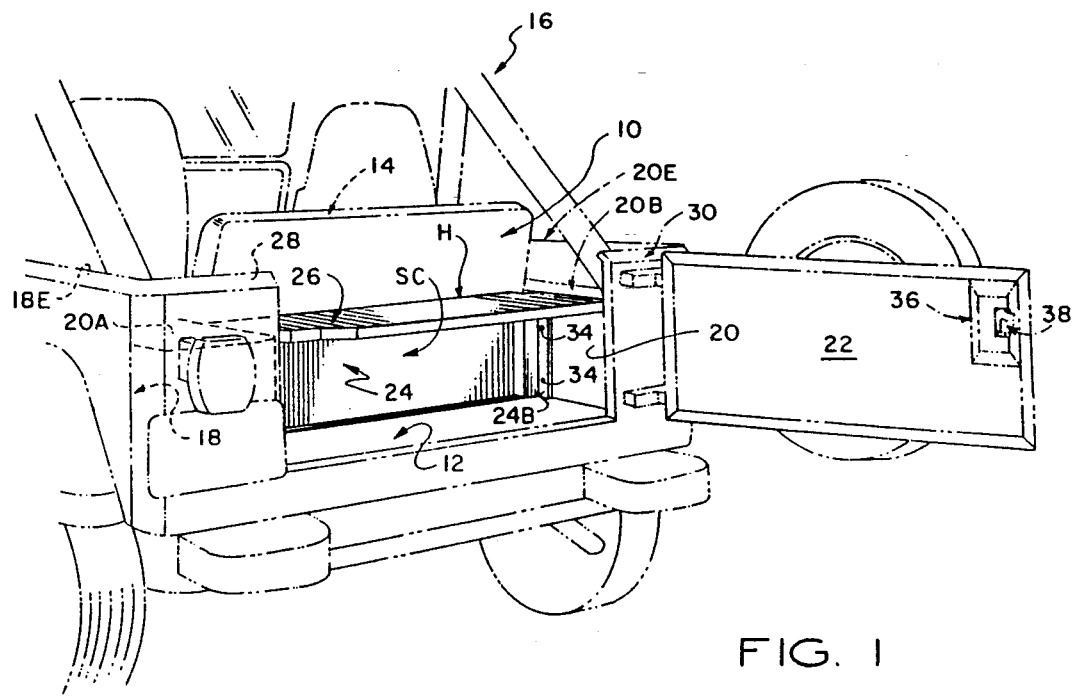
FIG. 1 is a perspective view of the convertible security enclosure of the present invention shown mounted on the load deck of a jeep vehicle in the closed compartment configuration.

In the description which follows, an exemplary embodiment of the invention is described and illustrated in combination with the open deck of a jeep vehicle. It will be understood, however, that the security enclosure of the present invention may be used in combination with any vehicle having an open deck, deck sidewalls, and a tailgate.

Like parts are indicated by the same reference numerals throughout the specification and drawings, respectively. The drawings are not necessarily to scale and, in some instances, proportions have been exaggerated in order to more clearly depict certain features of the invention.

Figure 2:
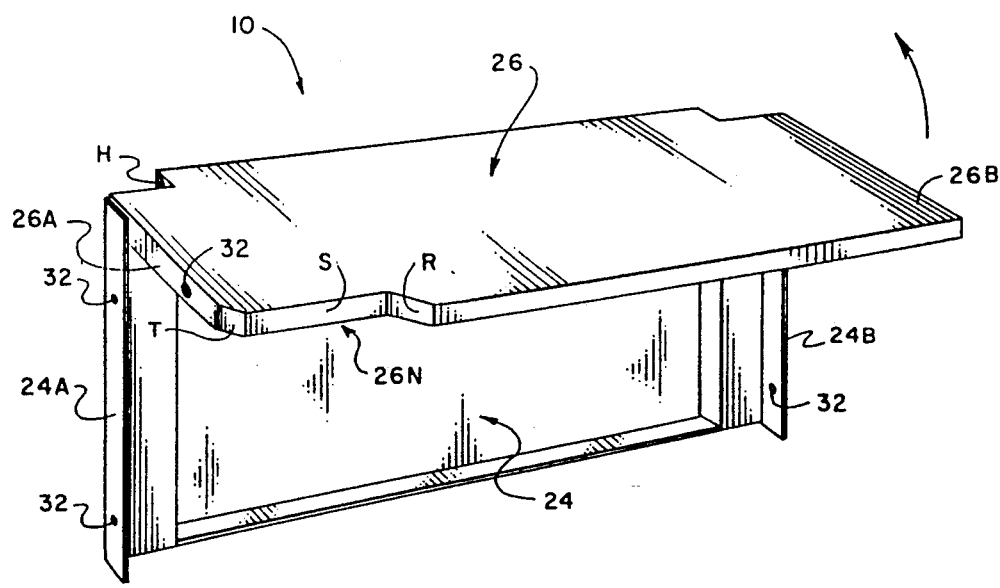
FIG. 2 is a perspective view of the convertible security enclosure.
Figure 6:
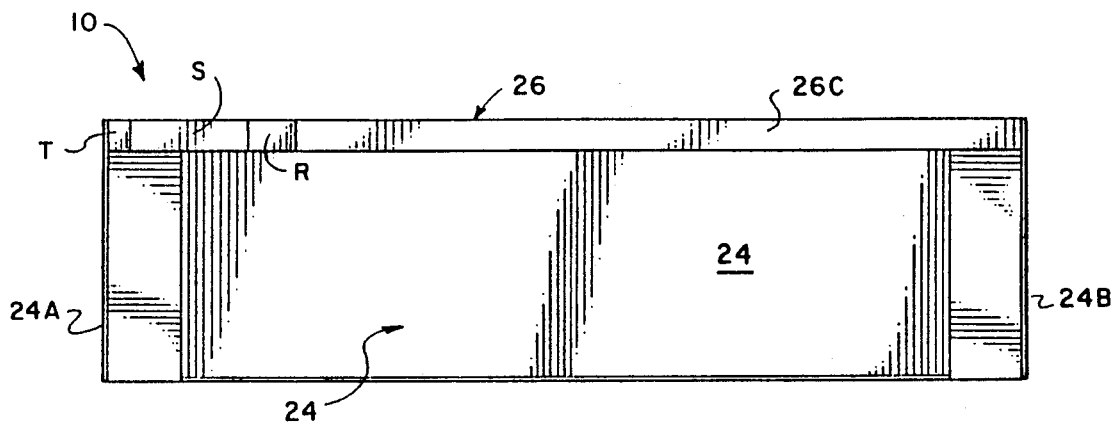
FIG. 6 is a front elevational view of the convertible security enclosure of the present invention.
Figure 7:
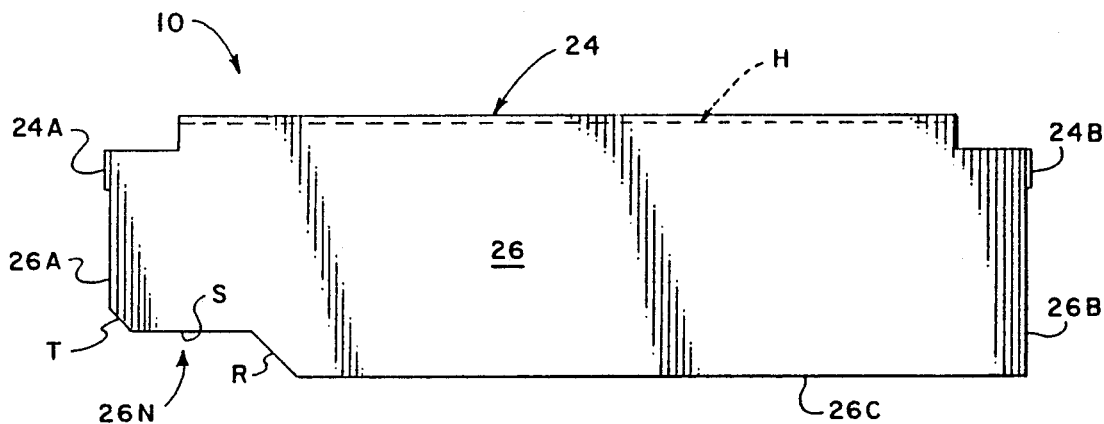
FIG. 7 is a top plan view thereof.
Figure 8:
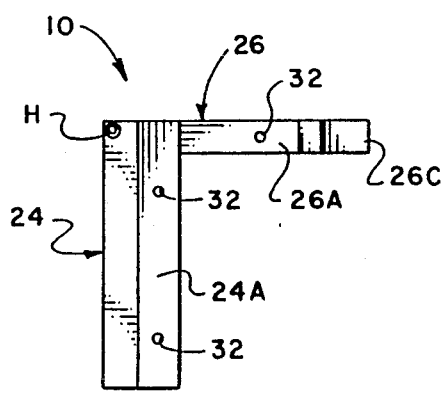
FIG. 8 is a left side elevational view thereof.
Figure 9:
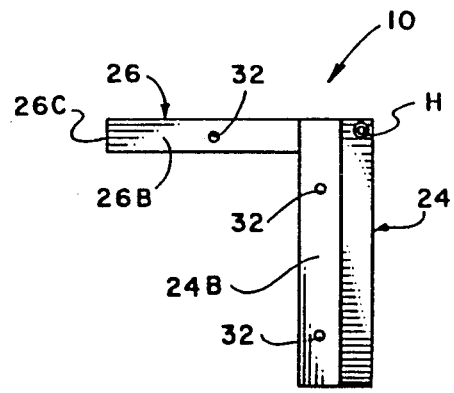
FIG. 9 is a right side elevational view thereof.

Referring to FIG. 1 and FIG. 2, a convertible security enclosure 10 is mounted on an open deck 12 which extends immediately behind the rear seat 14 of a jeep vehicle 16. The open deck area behind the rear seat 14 defines a security compartment SC which partially is enclosed by the flat rectangular deck 12, opposite deck sidewalls 18, 20, and a tailgate 22. The tailgate 22 is hinged for horizontal swingable movement relative to the rear end of the load deck 12.

According to the preferred embodiment of the present invention, the forward boundary of the load deck 12 and the security compartment SC is defined by a forward enclosure panel 24, and the top of the security compartment SC is defined by a top enclosure panel 26. Preferably, the panels 24, 26 are constructed of heavy gauge sheet metal, for example, No. 16 gauge galvanized steel.

The rear of the security compartment SC is defined in part by left and right tailgate deck panels 28, 30. The space between the left and right tailgate deck panels 28, 30 defines an access opening to the load deck 12 and the security compartment SC.

Referring now to FIGS. 6, 7, 8, 9, and 11, the forward panel 24 is movably coupled to the top panel 26 along a hinge H in an L-shaped configuration. Preferably, the forward enclosure panel 24 and top enclosure panel 26 extend transversely with respect to each other in right angle relationship in the closed compartment configuration shown in FIG. 1.

The forward enclosure panel 24 has a pair of integrally formed side flanges 24A, 24B. Each side flange 24A, 24B extends transversely with respect to the forward enclosure panel 24 in right angle relationship. The width dimension of the forward enclosure panel 24 is selected to provide flush engagement of the side flanges 24A, 24B against the deck sidewall panels 18, 20, respectively.

The top enclosure panel 26 is equipped with integrally formed side flanges 26A, 26B. The side flanges 26A, 26B extend transversely in right angle relationship with the top panel 26. The top panel 26 is also equipped with a rear flange 26C which projects in right angle relationship with the top panel 26.

Each of the transverse flanges 24A, 24B have bores 32 formed therein for receiving sheet metal screw fasteners 34 for rigidly attaching the forward enclosure panel 24 onto the left and right deck sidewalls 18, 20, respectively. The transverse side flanges 26A, 26B of the top enclosure panel 26 have bores 32 for receiving a releasable locking pin P as shown in FIG. 5.

Figure 10:
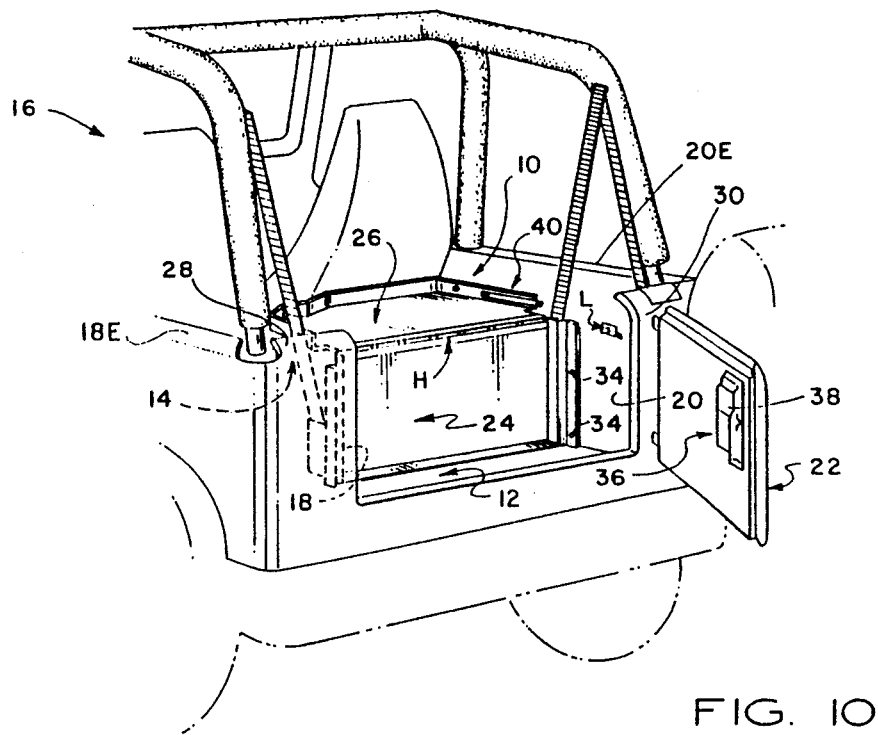
FIG. 10 is a perspective view similar to FIG. 3 showing the convertible security enclosure in the open compartment configuration in which the top enclosure panel overlies the rear seat back in its folded configuration.
Figure 11:
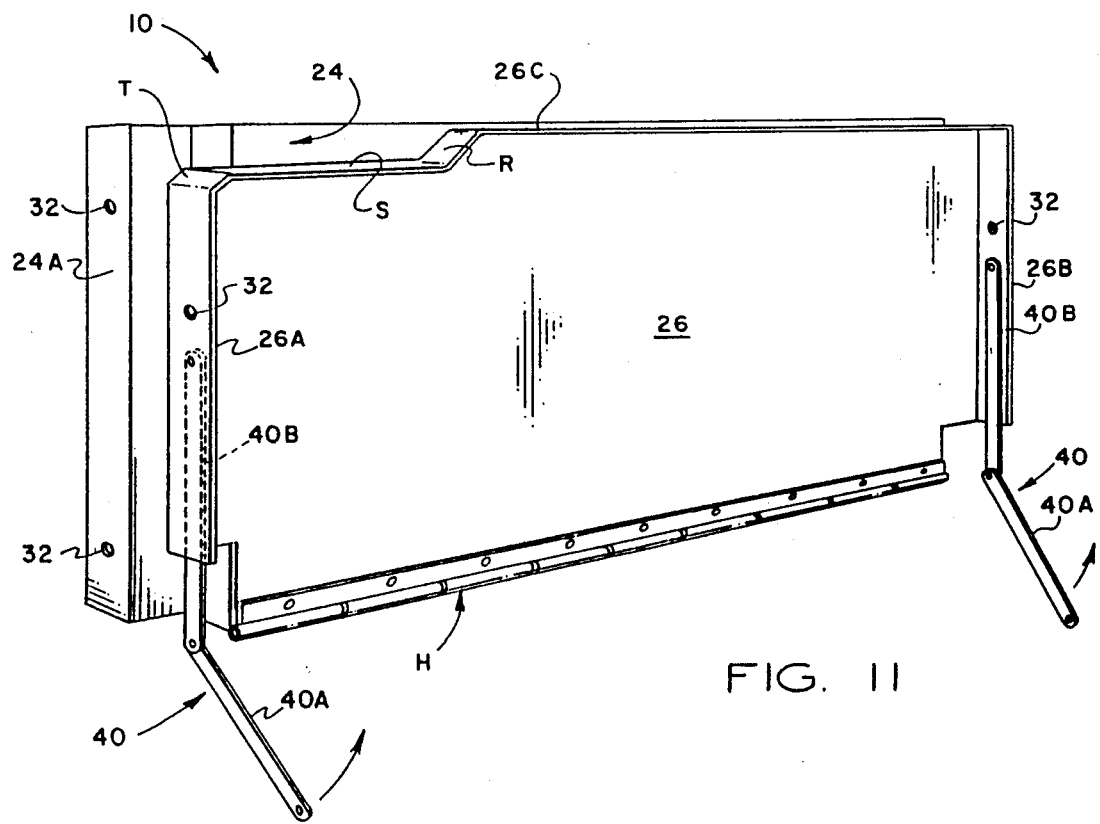
FIG. 11 is a perspective view of the convertible security enclosure of the present invention in a fully folded, compact configuration for shipping and storage.

Referring to FIG. 1 and FIG. 10, the security enclosure 10 is mounted onto the deck sidewalls 18, 20 by a plurality of sheet metal screw fasteners 34 which penetrate into the deck sidewalls 18, 20. In the arrangement shown in FIG. 3, the security enclosure 10 is positioned between the rear seat 14 and the left and right tailgate deck panels 18, 20. The external faces of the side flanges 24A, 24B and 26A, 26B are disposed in surface-to-surface engagement against the interior surfaces of the left and right deck sidewalls 18, 20, respectively. Each deck sidewall 18, 20 is inset and recessed below the deck sidewall edges 18E, 20E, respectively.

As shown in FIG. 1, the left and right deck sidewalls 18, 20 are stabilized by horizontal wheel well panels 20A, 20B which extend from the tailgate deck sidewalls 28, 30 to a position forward of the rear seat 14. Preferably, the top enclosure panel 26 is disposed in flush engagement with the horizontal wheel well panels 18A, 20A in the closed compartment configuration. According to this flush mounted arrangement, a deck covering, for example, a layer of carpet, may be installed on top of the horizontal panels 20A, 20B and on the top panel 26, whereby the security compartment and the top panel 26 are concealed when the tailgate 22 is closed.

The top enclosure panel 26 is releasably locked to the left and right deck side panels 18, 20 by a lock assembly L. The lock assembly L includes the spring loaded lock pin P and a retainer flange F. The lock pin P is received through the bore openings 32 formed in the top panel side flanges 26A, 26B. Referring now to FIG. 3, FIG. 5, and FIG. 10, the spring loaded lock pin P is movably coupled to the retainer flange F. A retainer flange F is mounted on each deck sidewall 18, 20 by a weld, a rivet, or by a screw fastener. The retainer flange F forms a pocket in combination with the deck sidewalls 18, 20 for receiving the side flanges 26A, 26B. The bore holes 32 in the side flanges 26, 26A are aligned with the lock pin P when the top enclosure panel is in its fully closed compartment position as shown in FIG. 1. The spring loaded lock pin P may be retracted manually to permit full insertion of the side flanges, and then is released for insertion into the bore holes 32. According to this arrangement, the lock assembly L is concealed when the top enclosure panel 26 is in the closed compartment configuration. Moreover, access to the lock assembly L can only be obtained by first unlocking the tailgate 22.

The top enclosure panel 26 has a notch opening 26N for receiving a latch housing 36 of the tailgate 22 when the tailgate is in the closed compartment position. The tailgate 22 fits within the access opening defined between the left and right tailgate deck panels 28, 30 when the tailgate is in the closed compartment position. Moreover, when the tailgate 22 is closed, the edge flange 26C on the top panel 26 adjoins the tailgate 22 in closely abutting, non-interfering relation. Preferably, the edge flange 26C is disposed in surface contact engagement against the tailgate 22 when the tailgate is closed. According to this arrangement, the tailgate 22 mechanically seals the security compartment SC when the tailgate is closed.

The latch housing 36 projects inwardly into the notch 26N in closely conforming, abutting relationship. When the tailgate 22 is closed, the tailgate latch housing 36 is disposed in closely abutting, non-interfering relation with the edge flange segments R, S, T which extend in right angle relationship with the top panel 26.

Because the security enclosure 10 lies below the deck sidewalls, it does not interfere with the attachment of a camper shell, canopy, tonneau cover, and the like. When the tailgate is closed, the security enclosure compartment SC is concealed and the top panel 26 appears to be a part of the rear wheel well structure. Moreover, the top panel is positioned in flush alignment with the horizontal wheel well panels 20A, 20B, thereby providing auxiliary deck storage immediately behind the rear seat and above the top panel and wheel well panels.

Because the top enclosure panel side edge flanges 26A, 26B are securely fastened by the lock pins P to the left and right deck side panels, access to the security compartment SC may be gained only by first opening the tailgate 22. The tailgate 22 has a lock assembly 38 which can be locked and released by a tailgate key. Accordingly, the compartment SC is secured and locked when the tailgate is closed and locked. Portable personal property such as mobile telephone equipment, briefcases, portable radios, tape decks, and the like can be safely stored within the security compartment SC when it is necessary to leave the vehicle unattended. Moreover, if the vehicle is equipped with an electronic security alarm which monitors the tailgate lock, the security compartment SC will be further protected by the on-board vehicle security system since the security enclosure 10 does not interfere with operation of the tailgate door 22 or the lock assembly 38.

Referring now to FIG. 3, FIG. 4, FIG. 5, and FIG. 10, the security enclosure 10 is convertible from the secure storage configuration to an open deck configuration for accommodating large, oversized articles. The conversion is initiated by first opening the tailgate 22 to provide access to the lock assembly L within the security compartment SC. The lock pin P is retracted out of the locking aperture 32 of the flange 26B. The top enclosure panel 26 may then be lifted upwardly and rotated counterclockwise as indicated by the arrow in FIG. 3. The top enclosure panel 26 may be extended upright and braced against the back side of the seat 14. For this purpose, the top enclosure panel 26 is stabilized in the upright orientation by a scissors lock assembly 40.

The scissors lock assembly 40 includes a first locking arm 40A which is pivotally coupled to a second locking arm 40B. The first locking arm 40A is pivotally coupled to the side flange 24B by a thumbscrew fastener 42. The opposite end of the locking arm 40B is pivotally coupled to the side flange 26B by a hinge rivet 44. When the top enclosure panel 26 is rotated to its full upright position against the back of the rear seat 14, the locking arms 40A, 40B are in straight alignment with each other, and the thumbscrew 42 is tightened securely against the side flange 24B, thus locking the top enclosure panel 26 in its upright orientation. A similar scissors lock assembly 40 is attached to the opposite side flange 24A for the same purpose. With the top enclosure panel in the upright orientation, the load deck 12 is exposed and the entire compartment is available for receiving oversized articles.

Referring now to FIG. 10, the top enclosure panel 26 may be further extended in pivotal movement to a position overlying the folded rear seat 14. In the fully extended position as shown in FIG. 10, the top enclosure panel 26 provides a stable, auxiliary load support surface for accommodating large items such as oversized suitcases and storage boxes. The fully extended position is obtained by first removing the thumbscrew 42 and releasing the lower lock arm 40A from the side flange 24B. After the seat back member of the rear seat 14 is folded forward, the top enclosure panel 26 is rotated clockwise through about 180 degrees until it lies on top of the folded seat back. The underside of the top enclosure panel 26 provides a flat, durable surface for supporting a heavy object. Moreover, the top enclosure panel shields the underlying seat back portion from being ripped, marked, or soiled by load materials placed on the top enclosure panel 26. The locking arms of the scissors lock 40 remain attached to the top enclosure panel 26, and are folded together along the side of the flange 26B.

When it is desired to return the security enclosure to its secure compartment configuration, the top enclosure panel 26 is rotated clockwise about the hinge H until the side flanges 26A, 26B are received within the pocket of the retainer flange F. At the same time, the forward end portions of the side flanges 26A, 26B engage against the forward panel member 24, as shown in FIG. 5. The lock pin P is then inserted into the locking aperture 32, thus securing the top enclosure panel 26 to the load deck sidewalls 18, 20. The lower locking arm 40A of the scissors lock assembly 40 is reattached to the side flange 24B by tightening the thumbscrew 42.

In contrast with prior art arrangements, the security enclosure 10 does not interfere with the use of portable coverings such as camper shells and canopies. Moreover, the security enclosure may be converted for open storage, so that no limitation is imposed on the use of the load deck of pickup trucks for cargo handling. Because of the recessed fit of the security compartment against the load deck sidewalls and the rear tailgate, the top panel of the security compartment appears to be an integral part of the load deck and load deck sidewalls. Because the security compartment paneling is fastened internally to the load deck sidewalls and the top enclosure panel is locked to the load deck sidewalls by the enclosed lock assembly, access to the security compartment can be gained only through the tailgate, and personal property may be safely secured within the security compartment merely by locking the tailgate.

A preferred embodiment of the invention has been described in detail. Since changes and modifications to the above preferred embodiment may be made without departing from the spirit of the invention, the scope of the invention is not limited to the foregoing details, except as set forth in the appended claims.

What is claimed is:

1. A security enclosure for installation on the load deck of an open deck vehicle of the type having a load deck, deck sidewalls and a tailgate, with the deck, deck sidewalls and the tailgate partially enclosing a security compartment, said security enclosure comprising, in combination:

top and forward enclosure panels movably coupled together along adjoining edges, said top and forward enclosure panels each having side flange members extending transversely with respect to said forward and top panels for attachment to the deck sidewalls;

releasable lock apparatus disposed within said security compartment for securing one of the side flange members of the top enclosure panel to one of the deck sidewalls;

a scissors lock assembly coupled to said forward enclosure panel and said top enclosure panel for stabilizing said top enclosure panel in an upright orientation relative to said load deck; and, said scissors lock assembly including a first locking arm, a second locking arm pivotally coupled to said first locking arm, and a threaded fastener coupled to one of said locking arms for opposing rotation of said one locking arm when said fastener is tightened.

* * * * *